United States Patent [19]

Sanji et al.

[11] Patent Number: 5,074,928
[45] Date of Patent: Dec. 24, 1991

[54] WATER-SOLUBLE SOLDERING FLUX

[75] Inventors: Masaki Sanji, Oobu; Toshihiko Taguchi, Saitama; Tomohiko Iino, Mouka; Kouichi Ootuka, Tokyo, all of Japan

[73] Assignees: Nippondenso Co., Ltd., Aichi; Senju Metal Industry Co., Ltd., Tokyo, both of Japan

[21] Appl. No.: 617,329

[22] Filed: Nov. 23, 1990

[30] Foreign Application Priority Data

Nov. 24, 1989 [JP] Japan .................................. 1-306059

[51] Int. Cl.$^5$ ............................................. B23K 35/34
[52] U.S. Cl. ....................................... 148/23; 148/24; 148/25
[58] Field of Search ..................................... 148/23-25

[56] References Cited

U.S. PATENT DOCUMENTS 2,155,307  4/1939  Hagemann ........................... 148/25
4,360,392  11/1982  Roberts .................................. 148/25
4,428,780  1/1984  Shedroff ............................... 148/25

Primary Examiner—Peter D. Rosenberg
Attorney, Agent, or Firm—Sughrue, Mion, Zinn, Macpeak & Seas

[57] ABSTRACT

A water-soluble soldering flux having good solderability, removability with water, and insulation resistance comprises, as activators, a combination of tartaric acid and a hydrohalide salt of mono-, di-, or tri-ethanolamine.

10 Claims, No Drawings

WATER-SOLUBLE SOLDERING FLUX

BACKGROUND OF THE INVENTION

1. Field of the Invention

This invention relates to a soldering flux and more particularly to a water-soluble soldering flux in which a residue of the flux remaining after soldering can be readily removed by washing with warm or cold water.

2. Prior Art

A soldering flux is used in soldering to chemically remove oxide films from the metal surface to be soldered and from the molten solder surface, thereby exposing solderable metal surfaces. It is therefore indispensable in all soldering processes.

A conventional flux used in soldering of electronic parts usually comprises rosin as the main activator. Such a rosin-based flux has good solderability, is non-corrosive and non-toxic, and the flux residue remaining after soldering has good electrical insulation properties. However, it is often necessary to wash off the residue of a rosin-based flux remaining after soldering, particularly when the flux is used to solder electronic parts of a precision electronic device such as a communication device or large-scale computer or of an important safety or maintenance device for an automobile, for example. This is because rosin is thermoplastic in nature and it is non-reactive at room temperature but is activated at elevated temperatures. Therefore, if any residue of the flux is left on or around a soldered part of a device, the insulating properties of the residual flux may be degraded at elevated temperatures, and as a result the device may operate improperly. For this reason, when a rosin-based flux is used in soldering, the flux residue remaining after soldering is completely removed in most cases by washing. Fluorinated or chlorinated organic solvents have conventionally been used to wash off the flux residue since they have a high dissolving power for rosin.

Nowadays, however, the use of fluorinated or chlorinated organic solvents is strictly regulated since these solvents tend to destroy the ozone layer surrounding the earth, thereby increasing the amount of ultraviolet rays, which are harmful to the human body, reaching the earth through the ozone layer. Another environmental problem involved in the use of such solvents is contamination of underground water by these solvents some of which are toxic.

Under these circumstances, increased attention is being directed to water-soluble soldering fluxes, which have the advantage that any flux residue remaining after soldering can be washed off with warm or cold water without use of a harmful organic solvent.

Several types of water-soluble soldering fluxes are known. They comprise as an activator an inorganic salt such as zinc chloride or ammonium chloride dissolved in glycerol or vaseline, or a hydrohalide salt of an amine dissolved in a water-miscible organic solvent.

However, these prior-art water-soluble soldering fluxes have the disadvantage that removal of flux residue deposited around the soldered areas by washing with water after soldering is rather difficult and labor- and time-consuming.

While it is desirable that any flux residue be completely removed after soldering, complete removal of flux residue deposited around soldered electronic parts is, in practice, very difficult. Even though flux residues cannot be completely removed by washing, the small amount of flux residues remaining around soldered areas will not create any serious problem if they do not decrease the insulation resistance of the soldered areas. However, the water-soluble soldering fluxes known in the art are hygroscopic, so even if only a slight amount of a residue of such a flux is left after soldering, it will decrease the insulation resistance of the soldered areas.

SUMMARY OF THE INVENTION

It is an object of this invention to provide a water-soluble soldering flux in which residue of the flux remaining after soldering can be readily removed by washing with water.

Another object of this invention is to provide a water-soluble soldering flux which does not appreciably decrease the insulation resistance of the soldered areas, if a slight amount of a residue of the flux is left after soldering.

It is known that various organic amine hydrohalide salts and carboxylic acids serve as an activator for soldering flux. However, as mentioned above, most amine hydrohalides and carboxylic acids involve some problem with respect to washability or insulation resistance of flux residues.

The present inventors have found that the use of a particular amine salt and a particular carboxylic acid in combination provides satisfactory results with respect to solderability, washability, and insulation resistance.

The present invention provides a water-soluble soldering flux which comprises, as activators, tartaric acid and at least one ethanolamine salt selected from hydrohalide salts of mono-di-, and tri-ethanolamine. Less preferably, the ethanolamine salt may be replaced by the free base, i.e., mono-, di-, or tri-ethanolamine itself.

DESCRIPTION OF THE PREFERRED EMBODIMENTS

The activators used in the water-soluble flux of the present invention are tartaric acid and at least one ethanolamine salt selected from a hydrohalide salt such as hydrochloride or hydrobromide salt of mono- di-, or tri-ethanolamine.

Tartaric acid is a dihydroxy-dicarboxylic acid of the formula HOOC—CH(OH)—CH(OH)—COOH. Usually L-tartaric acid is employed, but the D-isomer and a racemic body of tartaric acid may also be used in the present invention.

The ethanolamine salt useful as the other activator in the present invention is represented by the following general formula:

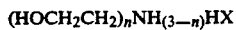

$(HOCH_2CH_2)_n NH_{(3-n)} HX$ wherein X is a halogen and n is an integer from 1 to 3. The halogen includes fluorine, chlorine, bromine, and iodine. Preferably, the halogen is chlorine or bromine, and more preferably it is chlorine.

When a hydrohalide salt of a higher alkanolamine such as a propanolamine is used in place of the ethanolamine salt, the washability or insulation resistance of the resulting flux will be impaired.

Any of mono-, di-, and tri-ethanolamine may be used in the form of its hydrohalide salt, which can be obtained by neutralizing the amine with a hydrohalogenic acid such as hydrochloric or hydrobromic acid. As mentioned above, a free ethanolamine, i.e., mono-, di-, or tri-ethanolamine may be used in place of its hydrohalide salt, although it is less preferable. The use of a hydrohalide salt of an ethanolamine enhances the activity of the flux compared to the cases where the amine is used as a free base.

Preferably, the amounts of tartaric acid and the ethanolamine salt are such that the molar ratio of tartaric acid to ethanolamine salt is in the range of from 0.2:1 to 4:1 and more preferably from 0.4:1 to 2:1.

When the flux according to the invention is applied, for example, to a printed circuit board on which electronic parts are soldered, it can be used either in a liquid form or in a paste form.

A liquid flux can be prepared by dissolving the above-mentioned two classes of activators in a solvent. Suitable solvents which can be used to prepare the liquid flux include water and water-miscible organic solvents Useful water-miscible solvents include lower alkanols such as ethyl alcohol and isopropyl alcohol; polyols such as glycerol, ethylene glycol, diethylene glycol, polyethylene glycol, and propylene glycol; ethers such a butyl carbitol; and the like. One or more of these solvents may be used in the flux.

Preferably the solvent is a mixture of water and at least one water-miscible solvent and more preferably a mixture of water and at least one lower alkanol solvent such as isopropyl alcohol to which a small amount of glycerol or other viscous polyol solvent is added in order to increase the viscosity of the liquid flux, thereby facilitating coating with the flux.

The concentrations of the activators in the liquid flux are not critical and greatly depends on the particular solvent or solvents used.

A paste flux can be prepared by admixing the activators with one or more water-miscible organic solvents which preferably contain at least one viscous solvent such as a polyol, e.g., diethylene glycol, glycerol, or polyethylene glycol. The solvents are used in a relatively small amount sufficient to form a paste.

If desired, the flux of the present invention either in a liquid or paste form may further comprise a small amount of one or more additional activators which include urea, and organic acids other than tartaric acid, particularly monocarboxylic acids such as acetic acid, glycolic acid, and lactic acid.

There is no need to add any resinous material to the flux as long as the viscosity of the flux is high enough for easy coating. If desired, a water-soluble resin may be added in a very slight amount. The flux may further contain various additives unless they adversely affect the flux. Examples of the additives are a foaming agent, a thickening agent such as a polyol (which also serves as a water-miscible solvent), an antioxidant such as hydroquinone, and a surfactant, particularly a nonionic surfactant serving as a resin-scavenger.

The water-soluble flux according to the present invention may be applied prior to soldering to those areas of a printed-circuit board, for example, to be soldered, by any suitable technique known in the art. For example, a liquid flux can be applied to the board by bubble coating, dip coating, or spray coating, usually after electronic parts to be soldered are mounted on the board. A paste flux can be applied by printing or by using an automatic flux dispenser before electronic parts are mounted on the board.

The flux may also be used to clean the surface of parts to be plated with a solder before the parts are plated, for example, by hot dipping.

Furthermore, the flux may be admixed with a powder solder and one or more organic solvents to form a paste solder. Useful powder solders include powders of Sn-Pb, Sn-Pb-Ag, Sn-Ag, Sn-Pb-Bi, and Pb-In alloys.

When the flux according to the present invention is used in soldering of electronic parts, most of residue of the flux remaining after soldering can be readily removed by washing with cold water or preferably with warm water. There is no need to wash with an organic solvent, particularly a harmful chlorinated or fluorinated solvent. Even if a slight portion of the residue remains around the soldered areas after washing, it will not impair the proper operation of the parts since the flux residue retains the insulation resistance in those areas at a satisfactorily high level.

The present invention will be described more fully by the following example which is given merely for illustration and is not intended to limit the scope of the invention.

EXAMPLE

Water-soluble fluxes in liquid forms which contained one or two activators (Activator A alone, or Activators A and B) shown in Table 1 were prepared by dissolving the activator or activators in a solvent consisting of water, isopropyl alcohol, and glycerol.

In all the fluxes, glycerol was present in an amount of 5% by weight based on the weight of the flux, and deionized water and isopropyl alcohol were used in equal weights. In Runs Nos. 7, 8, and 9, Activator A (tartaric acid) was present in amounts of 3, 10, and 15% by weight of the flux, respectively, while in the other runs Activator A was present in an amount of 5% by weight of the flux, Activator B, if present, was used in an amount sufficient to obtain a predetermined molar ratio relative to Ingredient A (molar ratio of A:B) indicated in Table 1.

For example, the fluxes of Runs Nos. 3, 7, 8, and 9 which all contained tartaric acid (Ingredient A) and monoethanolamine hydrochloride (Ingredient B) in a molar ratio of 1:1 had the following compositions in weight percent.

|  | Run No. 3 | Run No. 7 | Run No. 8 | Run No. 9 |
| --- | --- | --- | --- | --- |
| Glycerol | 5 | 5 | 5 | 5 |
| Tartaric acid | 5 | 3 | 10 | 15 |
| Monoethanolamine salt | 3.25 | 1.95 | 6.5 | 9.76 |
| Deionized water | 43.38 | 45.03 | 39.25 | 35.12 |
| Isopropyl alcohol | 43.38 | 45.03 | 39.25 | 35.12 |

Table 1 also includes the results of washability and insulation resistance tests of the fluxes, which were performed in the following manner.

Washability test

The flux to be tested was applied by dip coating to the predetermined areas on a printed circuit board on which electronic parts were to be mounted. The board was then dipped in a molten solder to deposit the solder on the predetermined areas. Subsequently, the soldered board was washed by successively dipping in three water baths at room temperature. The dipping period was one minute in each water bath, which was filled with running water to keep the water clean. After washing, the amount of ionic residues present on the printed circuit board was determined using an omega meter. The omega meter is a conductometric analyzer in which the ionic residues were dissolved and the electric conductivity of the resulting solution was measured. The amount of ionic residues determined was indicated in terms of micrograms (μg) of NaCl per square inch of the board which produced the same magnitude of conductivity as the ionic residues did.

Insulation resistance test

A comb-shaped board for the measurement of insulation resistance (according to JIS Z 3197) was dip-coated with the flux to be tested and then subjected to soldering and washing in the same manner as in the washability test. The washed board was then kept for 96 hours in a thermo-hygrostated chamber at a temperature of 60° C. and a relative humidity of 90% and the insulation resistance of the board was measured in the chamber after 24 hours. It had been confirmed that the insulation resistance after 24 hours showed the same tendency as that after 96 hours.

In the washability and insulation resistance tests, all the fluxes that were tested showed good solderability which was satisfactory for practical purposes, upon observation of the solder deposited in the predetermined areas on the board.

As can be seen from the results shown in Table 1, the soldering fluxes according to the present invention (Runs Nos. 1 to 9) had excellent washability and insulation resistance in addition to good solderability. In other words, they showed smaller amounts of ionic residues remaining after washing and larger orders of magnitude of insulation resistance after storage in a humid environment. Thus, residues of the flux remaining after soldering can be readily removed by washing with water. Furthermore, even if some residues are left around the soldered areas after washing, they do not result in a significant decrease in insulation resistance which causes improper operation of the soldered parts. On the other hand, comparable fluxes of Runs Nos. 10 to 18 showed lower insulation resistance and most of them had inferior washability.

TABLE 1

| Run No. | Activator A | Activator B | Molar Ratio A:B | Washability (μg-NaCl/in$^2$) | Insulation Resistance (Ω) |
|---|---|---|---|---|---|
| 1 | Tartaric acid (5%) | Monoethanolamine hydrochloride | 1:0.3 | 1.2 | $10^9$ |
| 2 | " | Monoethanolamine hydrochloride | 1:0.4 | 0.7 | $10^{10}$ |
| 3 | " | Monoethanolamine hydrochloride | 1:1 | 1.2 | $10^{10}$ |
| 4 | " | Monoethanolamine hydrochloride | 1:2 | 0.9 | $10^{10}$ |
| 5 | " | Monoethanolamine hydrochloride | 1:2.5 | 0.5 | $10^9$ |
| 6 | " | Triethanolamine hydrochloride | 1:1 | 1.8 | $10^{10}$ |
| 7 | Tartaric acid (3%) | Monoethanolamine hydrochloride | 1:1 | 1.0 | $10^{10}$ |
| 8 | Tartaric acid (10%) | Monoethanolamine hydrochloride | 1:1 | 0.9 | $10^{10}$ |
| 9 | Tartaric acid (15%) | Monoethanolamine hydrochloride | 1:1 | 1.2 | $10^{10}$ |
| 10 | Succinic acid | — | — | 10.1 | $10^8$ |
| 11 | Tartaric acid | — | — | 3.1 | $10^8$ |
| 12 | Citric acid | — | — | 2.0 | $10^8$ |
| 13 | Monoethylamine hydrochloride | — | — | 13.4 | $10^7$ |
| 14 | Hexylamine hydrochloride | — | — | 18.7 | $10^7$ |
| 15 | Triethylamine hydrochloride | — | — | 22.3 | $10^6$ |
| 16 | Monoethanolamine hydrochloride | — | — | 2.6 | $10^6$ |
| 17 | Glutamic acid hydrochloride | — | — | 10.5 | $10^7$ |
| 18 | Citric acid | Monoethanolamine hydrochloride | 1:1 | 1.0 | $10^8$ |

Although the present invention has been set forth with respect to preferred embodiments, it should be understood that the present invention is not limited to the specific details set forth in the above. Variations and modifications can be made without departing from the scope of the claimed invention.

What is claimed is:

1. A water-soluble soldering flux comprising, as activators, tartaric acid and at least one compound selected from mono- di-, and tri-ethanolamine and hydrohalide salts of these ethanolamines.

2. A water-soluble soldering flux comprising, as activators, tartaric acid and at least one ethanolamine salt selected from hydrohalide salts of mono- di-, and tri-ethanolamine.

3. The water-soluble soldering flux of claim 2 wherein the molar ratio of tartaric acid to the ethanolamine salt is in the range of from 0.2:1 to 4:1.

4. The water-soluble soldering flux of claim 3 wherein the molar ratio of tartaric acid to the ethanolamine salt is in the range of from 0.4:1 to 2:1.

5. The water-soluble soldering flux of claim 2 wherein the ethanolamine salt is mono-, di-, or tri-ethanolamine hydrochloride.

6. The water-soluble soldering flux of claim 2 wherein tartaric acid and the ethanolamine salt are dissolved in a solvent to form a liquid flux.

7. The water-soluble soldering flux of claim 6 wherein the solvent is a mixture of water and at least one water-miscible organic solvent.

8. The water-soluble soldering flux of claim 7 wherein the organic solvent comprises a lower alkanol solvent and a small amount of a viscous polyol solvent.

9. The water-soluble soldering flux of claim 2 wherein tartaric acid and the ethanolamine salt are admixed with an organic solvent in an amount sufficient to form a paste flux.

10. A paste solder comprising a powder solder admixed with the water-soluble soldering flux of claim 2.

* * * * *